(12) United States Patent
Espinosa

(10) Patent No.: US 9,089,911 B2
(45) Date of Patent: Jul. 28, 2015

(54) SIDE MILLING ARBOR WITH QUAD DRIVE KEY ASSIST

(71) Applicant: Gil Espinosa, Dana Point, CA (US)

(72) Inventor: Gil Espinosa, Dana Point, CA (US)

(*) Notice: Subject to any disclaimer, the term of this patent is extended or adjusted under 35 U.S.C. 154(b) by 360 days.

(21) Appl. No.: 13/755,469

(22) Filed: Jan. 31, 2013

(65) Prior Publication Data

US 2014/0212238 A1 Jul. 31, 2014

(51) Int. Cl.
*B23C 5/26* (2006.01)
*B23C 5/22* (2006.01)
*B23B 31/40* (2006.01)

(52) U.S. Cl.
CPC ............... *B23C 5/26* (2013.01); *B23B 31/4073* (2013.01); *B23C 2210/02* (2013.01); *Y10T 407/192* (2015.01); *Y10T 409/30952* (2015.01)

(58) Field of Classification Search
CPC ........... Y10T 409/309352; Y10T 409/309408; Y10T 409/309464; Y10T 409/30952; Y10T 407/1904; Y10T 407/1924; Y10T 407/192; Y10T 407/1908; Y10T 279/16; Y10T 408/8923; B23C 2210/02; B23C 5/26
USPC .................. 409/231–234; 407/32, 40, 34, 42; 279/8; 408/201
See application file for complete search history.

(56) References Cited

U.S. PATENT DOCUMENTS

| | | | | |
|---|---|---|---|---|
| 2,995,963 A | * | 8/1961 | Lavallee | 408/233 |
| 5,607,263 A | * | 3/1997 | Nespeta et al. | 407/61 |
| 6,146,060 A | * | 11/2000 | Rydberg et al. | 407/40 |
| 6,623,202 B2 | * | 9/2003 | Hansson et al. | 82/161 |
| 7,527,459 B2 | * | 5/2009 | Stojanovski | 409/234 |
| 8,485,767 B2 | * | 7/2013 | Chen | 409/234 |
| 8,708,611 B2 | * | 4/2014 | Marshansky | 407/47 |
| 2007/0081873 A1 | * | 4/2007 | Blomstedt et al. | 409/234 |
| 2008/0247832 A1 | * | 10/2008 | Maier et al. | 407/40 |
| 2012/0107061 A1 | * | 5/2012 | Harif | 407/61 |
| 2012/0201629 A1 | * | 8/2012 | Dudzinsky | 411/411 |
| 2014/0308082 A1 | * | 10/2014 | Abe et al. | 407/37 |

FOREIGN PATENT DOCUMENTS

| | | | |
|---|---|---|---|
| DE | 102009035690 A1 | * | 2/2011 |
| JP | 2009-291858 A | * | 12/2009 |
| JP | 2012-071393 A | * | 4/2012 |
| WO | WO-2014/127391 A1 | * | 8/2014 |

* cited by examiner

*Primary Examiner* — Erica E Cadugan
(74) *Attorney, Agent, or Firm* — James E. Brunton

(57) ABSTRACT

A side milling cutter arbor for mounting a selected milling cutter on a vertical milling machine that includes first, second and third interconnected members. The first member has a generally cylindrical body portion and a reduced diameter shank portion connected to the body portion. The body portion is provided with a longitudinal bore having a first portion having a key way and a second portion, the second portion being generally rectangular in cross-section. The second member has a flange portion, an intermediate portion having a key receivable within the key way and an end portion, the end portion being generally rectangular in cross-section and being closely receivable within the second portion of the longitudinal bore of the first member. The third member functions to removably interconnect the first and second members.

12 Claims, 3 Drawing Sheets

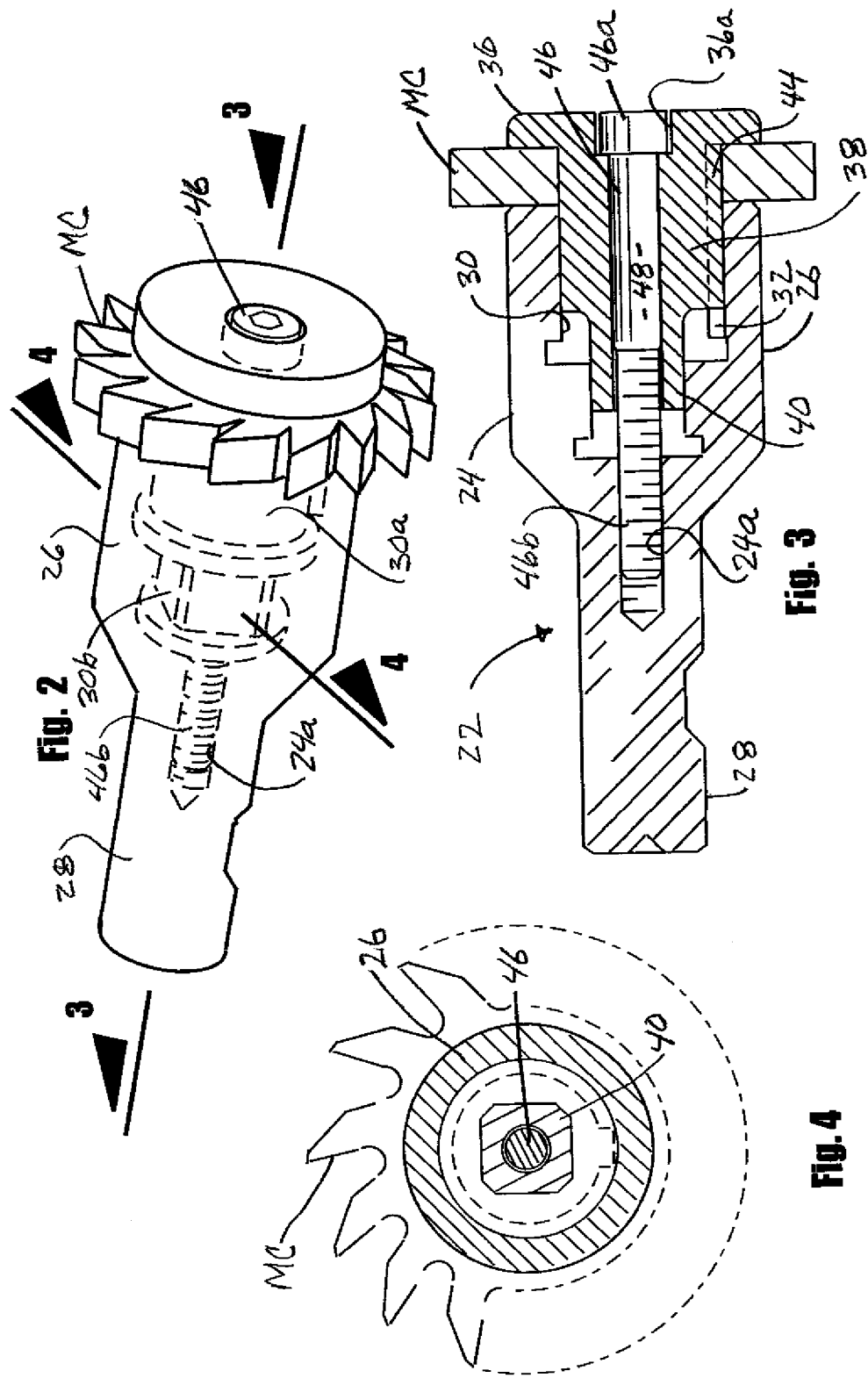

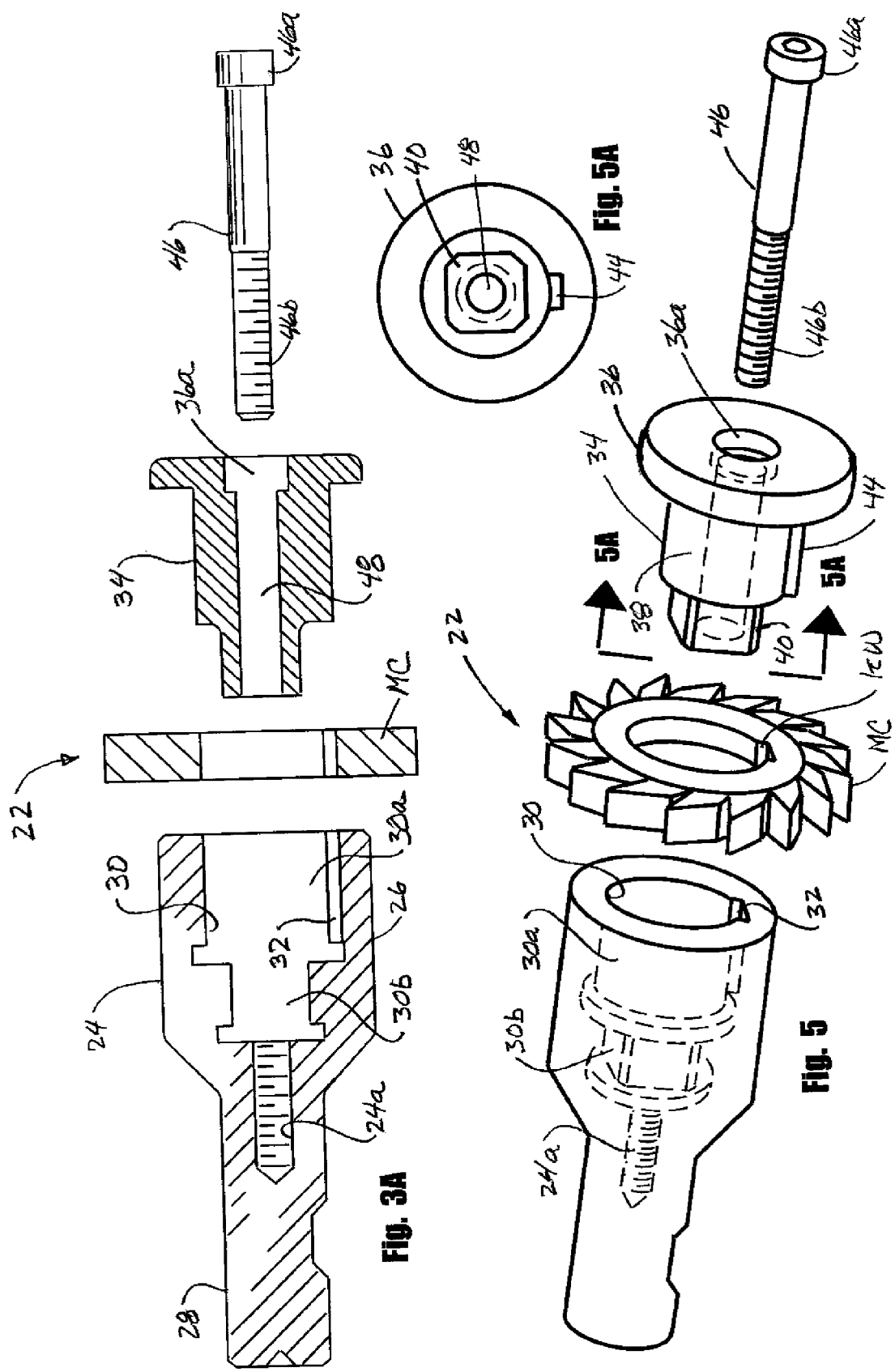

SIDE MILLING ARBOR WITH QUAD DRIVE KEY ASSIST

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of Invention

The present invention relates generally to attachments for machine tools. More particularly, the invention concerns a device for use in connection with vertical milling machines to rotatably connect a selected milling cutter to the milling machines.

2. Description of Related Art Including Information Disclosed Under 37 CFR 1.97 and 1.98

Vertical milling machines are of course old in the art and a number of different types of milling machines are readily commercially available. These commercially available milling machines may be generally classified into two main divisions, horizontal and vertical. In horizontal milling machines, the milling cutter is carried on a horizontal arbor (spindle), while in the vertical type milling machine, the arbor is vertically disposed.

Typically, vertical milling machines are built up from a massive casting, usually a rectangular box section forming an upright column which supports a vertical spindle that carries a rotating multi-toothed cutter. The upright column also supports an adjustable, power-driven, horizontal table which supports the work and controllably feeds it relative to the rotating spindle in a direction generally perpendicular to the axis of the spindle. Vertical milling machines are typically used for facing and boring and are sometimes provided with a rotary table for making cylindrical surfaces.

The rotating spindle of the vertical mill is typically carried by a quill which is controllably moveable in a vertical direction relative to the supporting column by a hand feed lever. Movement of the hand feed lever moves the quill and the cutting tool vertically relative to the work piece and to the work piece supporting table. The device of the present invention comprises a novel positive drive side milling cutting arbor for mounting a selected milling cutter on the milling machine.

BRIEF SUMMARY OF THE INVENTION

By way of brief summary, the side milling cutter arbor of the present invention cutting arbor for mounting a selected milling cutter on the vertical milling machine includes a first member having a generally cylindrical body portion and a reduced diameter shank portion connected to the body portion, the body portion being provided with a longitudinal bore having a first portion having a key way and a second portion, the second portion being generally rectangular in cross-section (a square drive); a second member removably connected to the first member, the second member having a flange portion, an intermediate portion having a key receivable within said key way and an end portion, the end portion being generally rectangular in cross-section and being closely receivable within the second portion of the longitudinal bore of the first member; and a third member for interconnecting the first and second members.

With the foregoing in mind, it is an object of the present invention to provide a simple, easy-to-use, positive drive side milling cutting arbor which can be readily interconnected with a variety of commercially available vertical and horizontal milling machines, including manual machines and programmable, computer numerically controlled (C.N.C.) machines.

Another object of the invention is to provide a side milling cutting arbor of the aforementioned character which comprises a three part arbor of unique design that can be quickly and easily removably affixed to the milling machine.

Another object of the invention is to provide a side milling cutting arbor of the type described in the preceding paragraphs which includes an innovative square drive key assist.

Another object of the invention is to provide a side milling cutting arbor of the type described in the preceding paragraph that provides 360 degrees of even torque assist.

Another object of the invention is to provide a side milling cutting arbor that can be used by any qualified machinist with a minimum amount of instruction.

BRIEF DESCRIPTION OF SEVERAL VIEWS OF THE DRAWINGS

The invention will be more fully understood by reference to the following drawings which are for illustrative purposes only:

FIG. 2 is a generally perspective view of one form of the side milling cutting arbor of the invention showing a conventional cutting tool mounted on the arbor.

FIG. 3 is a cross-sectional view taken along lines 3-3 of FIG. 2.

FIG. 3A is a cross-sectional, exploded view of the side milling cutting arbor shown in FIG. 3

FIG. 4 is a cross-sectional view taken along lines 4-4 of FIG. 3.

FIG. 5 is a generally perspective, exploded view of the side milling cutting arbor shown in FIG. 2.

FIG. 5A is a cross-sectional view taken along lines 5A-5A of FIG. 5.

DETAILED DESCRIPTION OF THE INVENTION

Figure 1:
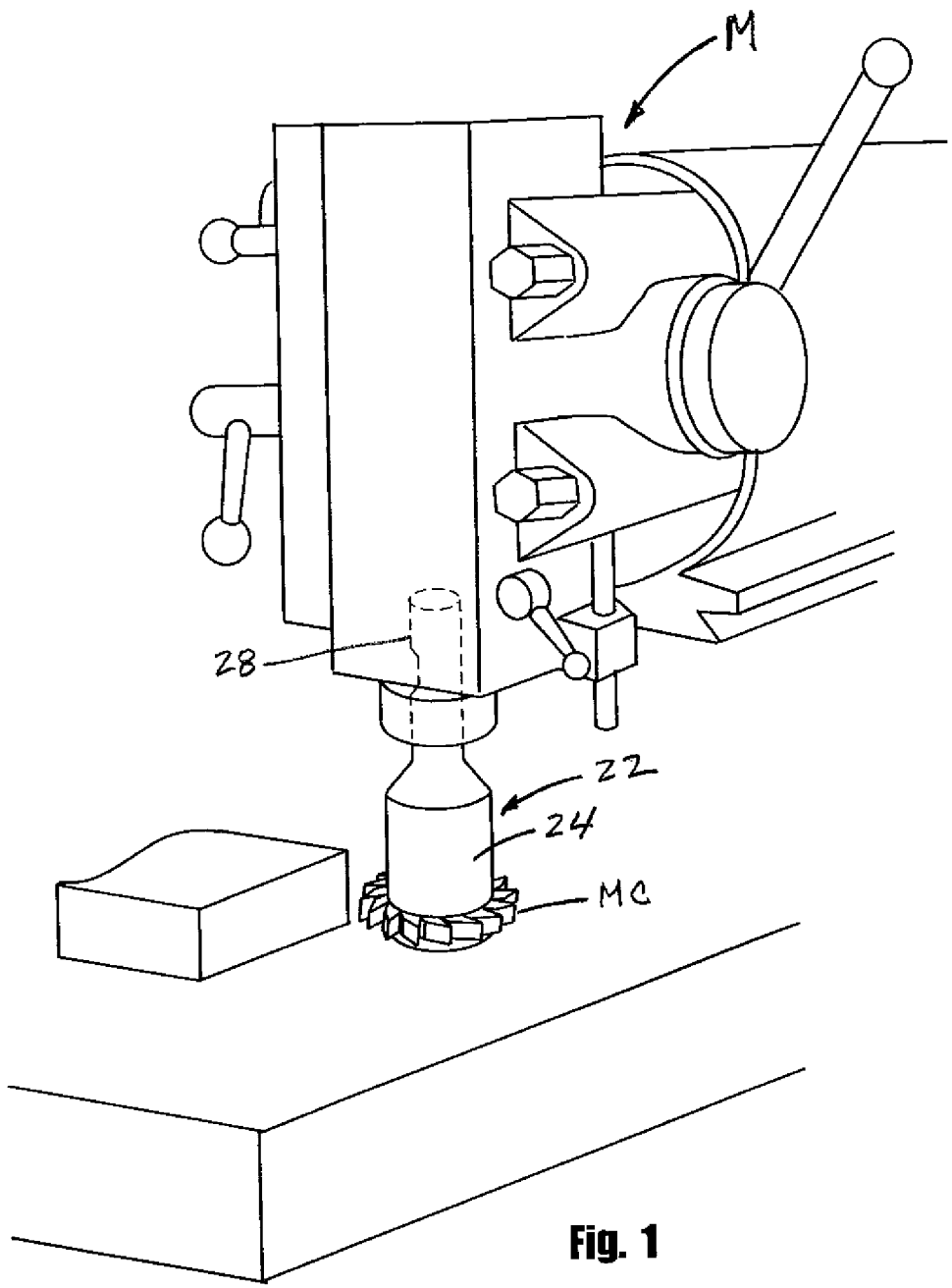
FIG. 1 is a generally perspective view of a conventional milling machine showing one form of the side milling cutting arbor of the invention mounted on the milling machine.

Referring to the drawings and particularly to FIGS. 1, 3, 3A and 5, one form of the side milling cutting arbor of the invention for mounting a selected milling cutter "MC" on a milling machine "M" is there shown and generally designated by the numeral 22. This form of the side milling cutting arbor comprises a first member 24 having a generally cylindrical body portion 26 and a reduced diameter shank portion 28 that is integrally formed with the body portion. As best seen in FIG. 3A of the drawings, first member 24 is provided with a threaded bore 24a. Similarly, body portion 26 is provided with a longitudinal bore 30 having a generally cylindrically shaped first portion 30a and a second portion 30b. For a purpose presently to be described, first portion 30a is provided with an elongate, longitudinally extending key way 32.

As best seen in FIGS. 2 and 5 of the drawings, the second portion 30b of the longitudinal bore 30 is generally rectangular in cross-section.

Side milling cutting arbor 22 also includes a second member 34 that, in a manner presently to be described, is removably connected to first member 24. Second member 34 has a flange portion 36, a generally cylindrically shaped intermediate portion 38 and an end portion 40. For a purpose presently to be described, flange portion 36 is provided with a central cavity 36a. Importantly, end portion 40, which is generally rectangular in cross-section, is closely receivable within the second portion 30b of the longitudinal bore 30 of the first member. Intermediate portion 38 of member 34 is provided with an elongate key 44 (FIG. 5) that, in the manner shown in FIG. 3 of the drawings, is closely receivable within the key way 32 that is provided within the first portion 30a the longitudinal bore 30.

Also forming a part of the side milling cutting arbor of the present invention is an elongated third member 46 that, in a manner presently to be described, functions to interconnect the first and second members 24 and 34. As best seen in FIG. 5 of the drawings, third member 46 has a head portion 46a and a threaded shank portion 46b. Shank portion 46b is closely receivable within a longitudinal bore 48 formed in second member 34, while head portion 46a is closely receivable within central cavity 36a. As best seen in FIGS. 2 and 3 of the drawings, threaded shank portion 46b of third member 46 is threadably receivable within threaded bore 24a of member 24.

In using the side milling cutting arbor of the invention, the milling cutter "MC" is positioned between the first and second members 24 and 34 in the manner shown in FIG. 5 of the drawings and member 34 is telescopically mated with member 24. This mating step is accomplished by sliding the key 44 of the second member into the key way "KW" formed in the milling cutter and into the key way 32 formed and first member 24 and then by sliding the second member into the central bore 30 of the first member to a position wherein end portion 40 securely seats within cavity 30b of first member 24. This done, third member 46 is inserted into the longitudinal bore 48 of second member 34 and is advanced to a position wherein the threaded shank portion 46b is received within the threaded bore 24a of first member 24. Rotation of the third member will then cause it to move into the position shown in FIG. 3 of the drawings thereby securing the milling cutter in position and securely locking the rectangular shaped end portion 40 of the second member in position within the rectangular shaped cavity 30b formed in the first member 24. The assemblage thus formed can be interconnected with the milling machine in a manner well understood by those skilled in the art and as shown in FIG. 1 of the drawings.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

The invention claimed is:

1. A side milling cutter arbor comprising:
   (a) a first member having a body portion and a shank portion connected to said body portion, said body portion including a longitudinal bore having a first portion and a second portion, said second portion being generally rectangular in cross-section;
   (b) a second member removably connected to said first member, said second member having a flange portion, an intermediate portion and an end portion, said end portion being generally rectangular in cross-section; and
   (c) a third member for interconnecting said first and second members; and
   (d) a cutting disk configured to be sandwiched between the first and second members when the first and second members are interconnected by the third member.

2. The side milling cutting arbor as defined in claim 1 in which said first portion of said longitudinal bore of said first member is provided with a key way and in which said intermediate portion of said second member is provided with a key receivable within said key way.

3. The side milling cutting arbor as defined in claim 1 in which said first portion of said longitudinal bore of said first member is generally cylindrical and in which said intermediate portion of said second member is generally cylindrical and is closely received within said first portion of said longitudinal bore.

4. The side milling cutting arbor as defined in claim 1 in which said shank portion of said first member is provided with a threaded bore and in which said third member of said side milling cutting arbor includes a threaded shank portion.

5. The side milling cutting arbor as defined in claim 1 in which said flange portion of said second member is provided with a cavity and in which said third member of said side milling cutting arbor includes a head portion closely receivable within said cavity.

6. A side milling cutter arbor comprising:
   (a) a first member having a generally cylindrical body portion and a reduced diameter shank portion connected to said body portion, said body portion including a longitudinal bore having a first portion having a key way, and said longitudinal bore also having a second portion, said second portion being generally rectangular in cross-section;
   (b) a second member removably connected to said first member, said second member having a flange portion, an intermediate portion having a key receivable within said key way, and an end portion, said end portion being generally rectangular in cross-section and to be closely receivable within said second portion of said longitudinal bore of said first member; and
   (c) a third member for interconnecting said first and second members.

7. The side milling cutting arbor as defined in claim 6 in which said first portion of said longitudinal bore of said first member is generally cylindrical and in which said intermediate portion of said second member is generally cylindrical and is closely received within said first portion of said longitudinal bore.

8. The side milling cutting arbor as defined in claim 7 in which said shank portion of said first member is provided with a threaded bore and in which said third member of said side milling cutting arbor includes a threaded shank portion.

9. The side milling cutting arbor as defined in claim 8 in which said flange portion of said second member is provided with a central cavity and in which said third member of said side milling cutting arbor includes a head portion closely receivable within said central cavity.

10. A side milling cutter arbor comprising:
    (a) a first member having a generally cylindrical body portion and a reduced diameter shank portion connected to said body portion, said body portion including a generally cylindrical longitudinal bore having a first portion having a key way, and said longitudinal bore also having a second portion, said second portion being generally rectangular in cross-section;

(b) a second member removably connected to said first member, said second member having a flange portion, a generally cylindrical intermediate portion having a key receivable within said key way, and an end portion, said end portion being generally rectangular in cross-section and to be closely receivable within said second portion of said longitudinal bore of said first member; and (c) a third member for interconnecting said first and second members, said third member having a head portion and a threaded shank portion.

11. The side milling cutting arbor as defined in claim 10 in which said shank portion of said first member is provided with a threaded bore.

12. The side milling cutting arbor as defined in claim 11 in which said flange portion of said second member is provided with a central cavity and in which said head portion of said third member is closely receivable within said central cavity.

* * * * *